(12) United States Patent
Hrusecky et al.

(10) Patent No.: US 6,317,164 B1
(45) Date of Patent: Nov. 13, 2001

(54) SYSTEM FOR CREATING MULTIPLE SCALED VIDEOS FROM ENCODED VIDEO SOURCES

(75) Inventors: David A. Hrusecky, Johnson City; Bryan J. Lloyd, Vestal; Chuck Ngai, Endwell, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,172

(22) Filed: Jan. 28, 1999

(51) Int. Cl.[7] ............................. H04N 5/445; H04N 5/45
(52) U.S. Cl. .................... 348/581; 348/564; 348/565; 348/569; 348/588; 348/705
(58) Field of Search ................................ 348/563, 564, 348/565, 567, 569, 581, 583, 584, 586, 588, 705; H04N 5/45, 5/445, 5/268

(56) References Cited

U.S. PATENT DOCUMENTS

| | | | |
|---|---|---|---|
| 5,047,858 | 9/1991 | Aimonoya | 358/183 |
| 5,083,205 | 1/1992 | Arai | 358/140 |
| 5,253,056 | 10/1993 | Puri et al. | 358/133 |
| 5,351,129 | * 9/1994 | Lai | 348/584 |
| 5,365,278 | 11/1994 | Willis | 348/581 |
| 5,371,549 | * 12/1994 | Park | 348/564 |
| 5,402,513 | 3/1995 | Schafer | 382/47 |
| 5,444,491 | 8/1995 | Lim | 348/441 |
| 5,486,871 | 1/1996 | Filliman et al. | 348/558 |
| 5,638,130 | 6/1997 | Linzer | 348/445 |
| 5,742,892 | 4/1998 | Chaddha | 455/5.1 |
| 5,784,095 | 7/1998 | Robbins et al. | 348/6 |
| 5,790,714 | 8/1998 | McNeil et al. | 382/300 |
| 5,801,753 | 9/1998 | Eyer et al. | 348/13 |
| 5,801,783 | * 9/1998 | Crump | 348/563 |

FOREIGN PATENT DOCUMENTS

| | | | | |
|---|---|---|---|---|
| 0 550 911 A1 | 12/1992 | (EP) | | H04N/5/44 |
| 0 369 303 A2 | 11/1988 | (EP) | | H04N/5/45 |
| 2 275 585 A | 2/1994 | (GB) | | H04N/5/45 |
| 08256315 | 3/1995 | (JP) | | H04N/5/45 |
| 9083896 | 4/1997 | (JP) | | H04N/5/45 |
| 9093541 | 3/1997 | (JP) | | H04N/7/00 |

OTHER PUBLICATIONS

U.S. application No. 08/958,632, Cheney et al., filed Oct. 27, 1997, "A Multi–Format Reduced Memory MPEG Digital Video Decoder".

* cited by examiner

*Primary Examiner*—Sherrie Hsia
(74) *Attorney, Agent, or Firm*—Jhn R. Pivnichnv

(57) ABSTRACT

Multiple scaled videos are created using a single video decoder. A plurality of digital video data streams may be displayed in scaled or full-size on a video display. A viewer may select one or more of the scaled videos for display using a remote control. Downsampled frames may be scrolled into view using the remote control. A viewer may select a video to view in real time at full size or in scaled format.

15 Claims, 3 Drawing Sheets

SYSTEM FOR CREATING MULTIPLE SCALED VIDEOS FROM ENCODED VIDEO SOURCES

TECHNICAL FIELD

The invention relates to decoding of digital video data and particularly to decoding of a plurality of digital video data streams using a single decoder. Even more particularly the invention relates to downscaled decoding and display of multiple digital video sources.

BACKGROUND OF THE INVENTION

The transmission of digital video data streams from a source such as a television camera or motion picture to a viewing display involves very high data rates. A number of data compression schemes have therefore been developed or proposed to reduce the actual transmission bit rate requirement while preserving high quality images. One such development has been adopted by the International Standards Organization (ISO) as standard ISO 11172-2 entitled "Coding of Motion Pictures and Associated Audio for Digital Storage Media at up to about 1.5 Mbit/sec." This standard is commonly referred to as "MPEG-1". A second standard also adopted by ISO is ISO 13818-2 entitled "Generic Coding of Moving Pictures and Associated Audio Information: Video," referred to as "MPEG-2".

In some applications it may be desirable to display the video data at the receiving end with a reduced size. For example, one may wish to watch one video on a television screen while monitoring a second video of lesser importance in a reduced size window within the larger television screen. Such techniques sometimes referred to as Picture in Picture (PIP) are well known in the analog television art. Arai in U.S. Pat. No. 5,083,205 for example describes a receiver with multiple demodulators to produce a PIP display format. Aimonoya in U.S. Pat. No. 5,047,858 describes a method of combining images from several analog sources on the screen of a single television monitor. Filliman, et al. in U.S. Pat. No. 5,486,871 describe a control system for an adjustable deflection system to expand or shrink the size of video images on a display screen.

In general these techniques require the use of multiple tuners or multiple demodulators, one for each video source one wishes to view, and then reducing the effective size of one or more of the analog images before combining the images for display. All of the video sources are displayed in real time. One can also combine images at the source site before transmission, and then send out a single analog video with the combined images, with at least one in a reduced size window. In this case an ordinary receiver with a single tuner and single demodulator can be used, however individual viewers would have no choice in the particular combination selected at the source site.

More recently, various techniques have been developed for scaling the size of a digital video image at the receiver. Lim, in U.S. Pat. No. 5,444,491 describes a television receiver for determining the transmission format (e.g. resolution and frame rate) of encoded image frames, and properly displaying the image on the viewer display, including scaling up or down to fit the display size. Willis in U.S. Pat. No. 5,365,278 describes digitizing analog video signals. The digitized signals are then modified in a signal processing circuit to represent pictures in sizes smaller than the video display.

Chaddha, in U.S. Pat. No. 5,742,892 describes a decoder for upscaling the size of a small video by upsampling to increase the number of pixels displayed. McNeil, et al. in U.S. Pat. No. 5,790,714 describes scaling down by using area weighted averages of pixels in both the vertical and horizontal directions. To scale up an interpolation or replication process is used to double the pixel grid which is then scaled down to a final size greater than the original pixel grid using the area weighted average process. Puri, et al. in U.S. Pat. No. 5,253,056 describe an adaptive technique for encoding, and subsequently decoding scalable video signals. Schafer, in U.S. Pat. No. 5,402,513 describes a decoder for generating a scaled video output.

Japanese patent JP 9083896 describes decoding and scaling video data from multiple channels which has been multiplexed together along with an address generation indication into a single source. The resulting display shows the multiple channels simultaneously, in reduced from.

Scaling is also used to convert movie videos which typically have a 9:16 aspect ratio; that is the ratio of this height to the width is 9 to 16; to a television display which in the U.S. is about 3:4. One method called "letterbox" involves appending a blank area to the top and bottom of each picture in a movie video so that the total aspect ratio of the original picture plus blank area is 3:4. Another method called "pan-scan" selects a 3:4 ratio subpicture from a 9:16 picture, discarding the rest. The location of the selected subpicture may vary from picture to picture i.e. the most important part may be chosen, so that the selected subpicture is moved from left to right in a camera pan fashion as needed. As described by Linzer in U.S. Pat. No. 5,638,130 these two scaling methods can be applied at either the transmission end, in which case the receiver doesn't have to do anything, or else the receiver can do the scaling conversion. Pan and Scan data can be multiplexed with the video signal before transmission as described by Masaru, et al. in JP 9093541A. If the receiver has a 3:4 display, then the pan-scan data is used to select the 3:4 ratio subpicture and discard the rest. In the case where the receiver has a 9:16 display, the entire video image is displayed.

While the foregoing methods permit several video sources to be displayed on a single display screen with some or all in reduced size, this is accomplished by duplicating most of the decoding and scaling apparatus and only at the end combining the sources onto one screen image. In many applications this duplication is unnecessary and wasteful. For example, a program guide comprising a still image of each channel is usually sufficient, particularly if the still image is a relatively recent e.g. within the past few minutes, frame from the program in progress on that channel. In some security surveillance applications, a still image taken every few minutes may suffice. The viewer could then make a selection of which video source to watch in real time based on the still images. The source of video data could be television cameras located at various positions about a surveillance site. More remote sources could also be included by sending data over a cable, data network, or the internet.

Accordingly with the teachings of the present invention, there is provided a system for displaying multiple sources in a reduced size on a single display without use of expensive equipment duplication at the viewing location.

It is believed that such a system constitutes a significant advancement in the art.

OBJECTS AND SUMMARY OF THE INVENTION

It is therefore, a principal object of the present invention to enhance the art of digital video decoding and display by providing an improved system for creating multiple scaled videos from at least two encoded video sources.

It is another object to provide such a system with a control for selecting and scrolling the scaled videos.

It is yet another object to provide a method of creating such multiple scaled videos from at least two encoded video sources.

These and other objects are attained in accordance with one embodiment of the invention wherein there is provided a system for creating multiple scaled videos from at least two encoded video sources each having a plurality of frames, the system comprising means for switching between at least two encoded video sources, each having a plurality of frames, a digital video decoder, coupled to the means for switching, having a down-scaling function for generating downscaled frames from said plurality of frames, and a frame buffer, coupled to the digital video decoder, having storage for one or more downscaled frames from each of the at least two encoded video sources.

In accordance with another embodiment of the invention there is provided a system for creating multiple scaled videos from at least two encoded video sources each having a plurality of frames, the system comprising a selecting switch having as inputs at least two encoded video sources each having a plurality of frames, and an output providing one of the at least two encoded video sources, a digital video decoder, coupled to the output of the selecting switch, having downscaling circuitry adapted for generating downscaled frames from the plurality of frames, and a frame buffer, coupled to the digital video decoder, having storage for one or more downscaled frames from each of the at least two encoded video sources.

Finally, in accordance with another embodiment of the invention there is provided a method of creating multiple scaled videos from at least two encoded video sources each having a plurality of frames, the method comprising the steps of switching between at least two encoded video sources, each having a plurality of frames, decoding the video sources with a digital video decoder having a down-scaling function, including generating downscaled frames from the plurality of frames, and storing one or more downscaled frames from each of the at least two encoded video sources in a frame buffer.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
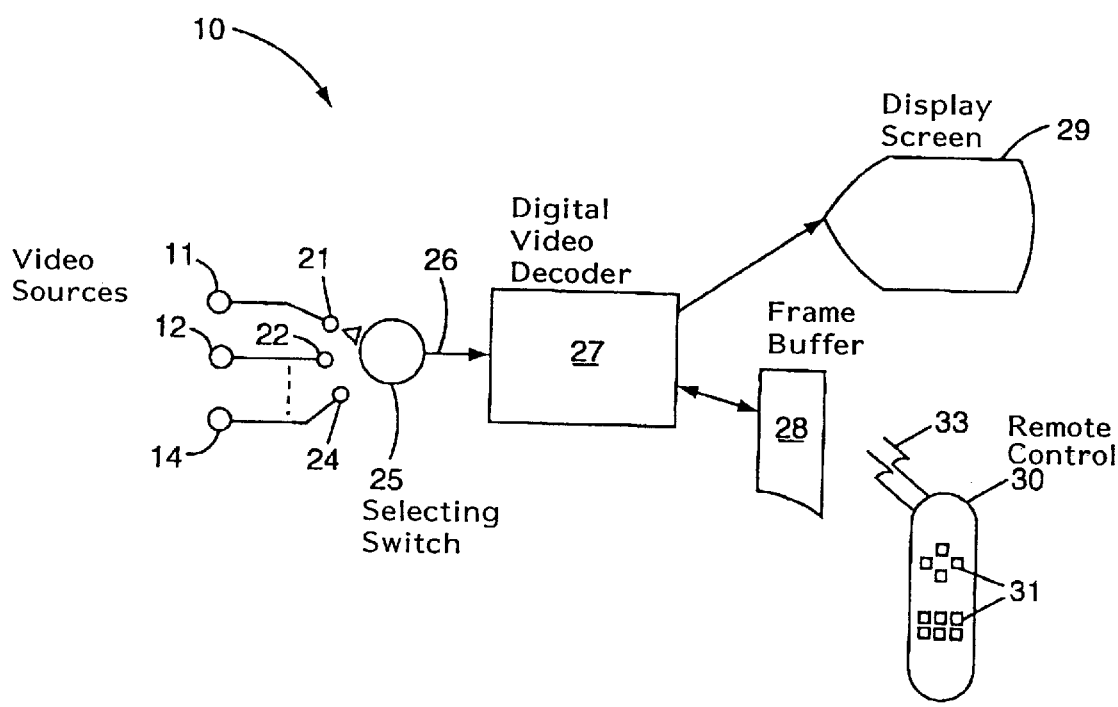
FIG. 1 illustrates a system in accordance with the present invention.

In FIG. 1 there is shown a system 10 for creating multiple scaled videos in accordance with the present invention. Encoded video sources 11, 12, 14 each having a plurality of video frames are input 21, 22, 24 to a selecting switch 25.

In a preferred embodiment video sources are encoded in accordance with an MPEG standard but may also be encoded using other standards and techniques which encode and/or compress the video data. The encoding may also include packetizing such as defined in ISO/IEC Standard 13818-1 "Generic Coding of Moving Pictures and Associated Audio: Systems", or the use of forward error correction codes such as the well known Viterbi and Reed-Solomon types. The encoding may also include lossy or lossless compression such as Lempel-Ziv compression. Sources 11–14 may be provided via a coaxial cable, fiber optic, or satellite or combination of various sources. They may also be provided by a CD ROM or DVD disk drive whether as part of a computer or individual units, or be provided over the internet using the many interconnection methods including telephone modem, token ring, various networks, and telecommunication techniques known in the art. Selecting switch 25 may be a logic switch or logic circuits controlled by digital video decoder 27, or by a remote control 30. Selecting switch 25 may also be a packet filtering system for selecting one or more sources from a multiplexed stream of different sources as defined in the ISO/IEC Standard 13818-1 listed above. It may also comprise several switched unity gain amplifiers with a common output. One of the encoded video sources appears at the output 26 of switch 25 and is coupled to digital video decoder 27 which is preferably an MPEG decoder but may also be any type of video decoder capable of processing an encoded digital video stream and producing a video image for storage in a frame buffer 28. The digital video decoder includes a downscaling function for generated a reduced size or downscaled frame. Digital video decoder 27 may also include an on screen display (OSD) processor for processing secondary video stills. One type of OSD processor is described in commonly assigned U.S. patent application Ser. No. 09/094,753 entitled "Color Mapped and Direct Color OSD Region Processor with support for 4:2:2 Profile Decode Function," which is hereby incorporated by reference in its entirety.

The OSD processor or digital video decoder can, for example, scale the size of an MPEG video presentation by a pre determined reduction factor, while displaying multiple previously scaled single frames. It can also perform upsampling of the decoded and scaled video to achieve a pre determined form factor that is convenient for arrangement on a video display. The upsampling amount may be exactly equal to that which would be employed to display the scaled video in a pre-determined form factor as if the intended display was for a regular DVB sourced video presentation (Digital Video Broadcast is defined in the European Telecommunications Standards Institute, Technical Report ETR 154). Consequently the OSD processor may be capable of performing any of the common horizontal upsamplings such as, but not limited to 352 to 720, 480 to 720, or 544 to 720. The OSD processor may also include a digital filter such as a FIR, IIR or any other type known in the art to perform an upsampling function that is selectable to a different value for each video image while allowing for several video images on the display 29 at any one time. The OSD processor may also include circuitry capable of performing a horizontal scroll for a pan and scan type of capability.

Frame buffer 28 has a capacity for storing at least one full size frame or one or more downscaled frames or various combinations of one or more downscaled frames overlapped on a full size frame comparable to a picture-in-picture format. A display screen 29 is coupled to the video decoder for viewing the frame image stored in the frame buffer. The display may be a conventional or High Definition (HDTV)

television screen, whether viewed directly or by projection. It may also be a computer monitor utilizing a cathode ray tube. It may also be a liquid crystal display (LCD) or other type of flat panel display.

A control 30 preferably a remote control has buttons, switches, knobs, or other selecting means 31 for the viewer to control which downscaled and full size frames are shown on display 29. The control is preferably coupled to decoder 27, switch 25, or display 29 by infrared signals 33, but may also be coupled by other wireless techniques including radio frequency signals. It may also be coupled using wires, cables, fiber optic, or mechanical techniques.

Figure 2:
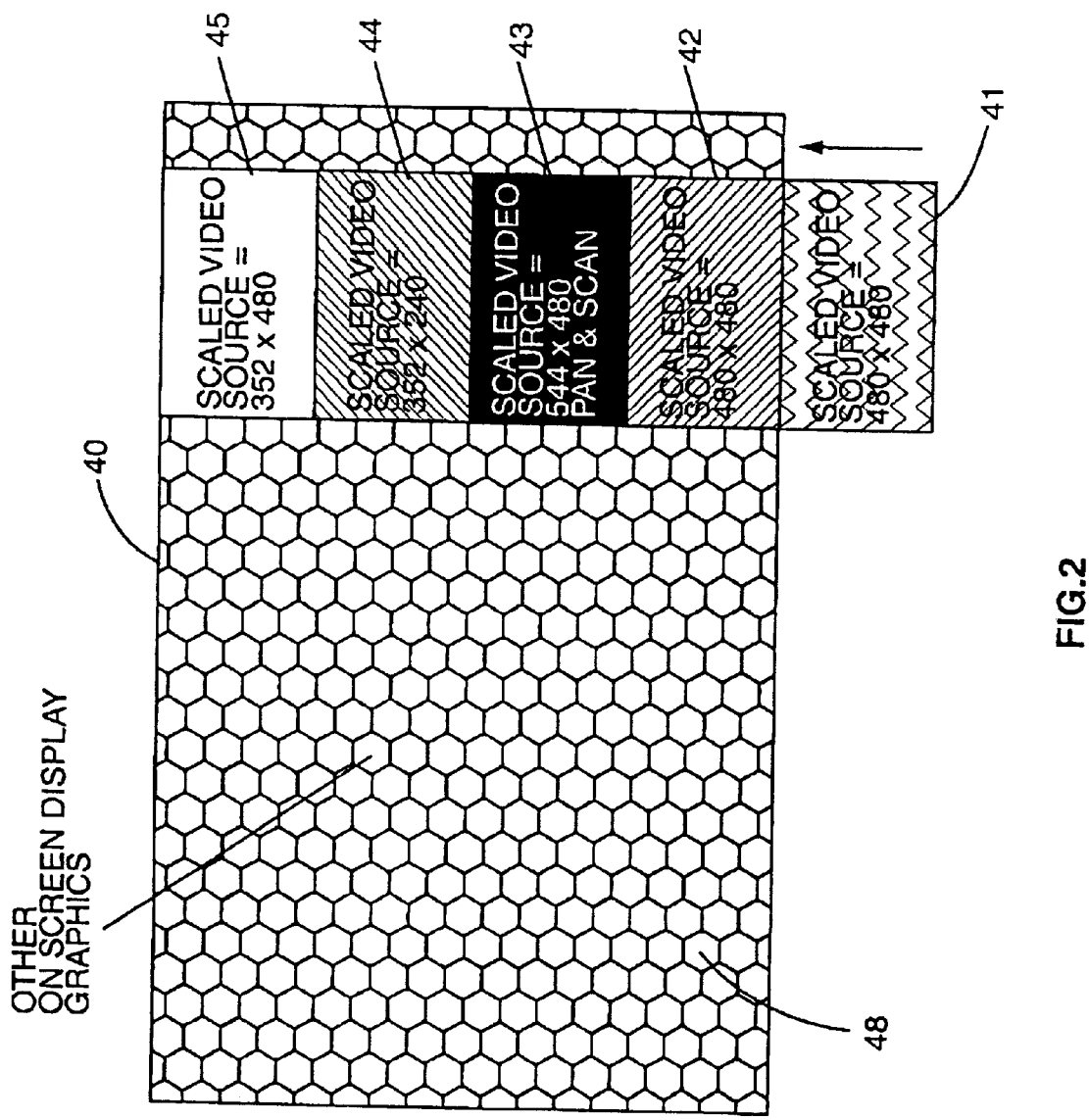
FIG. 2 shows an example of a display having four scaled video sources displayed and a fifth source ready for display.
Figure 3:
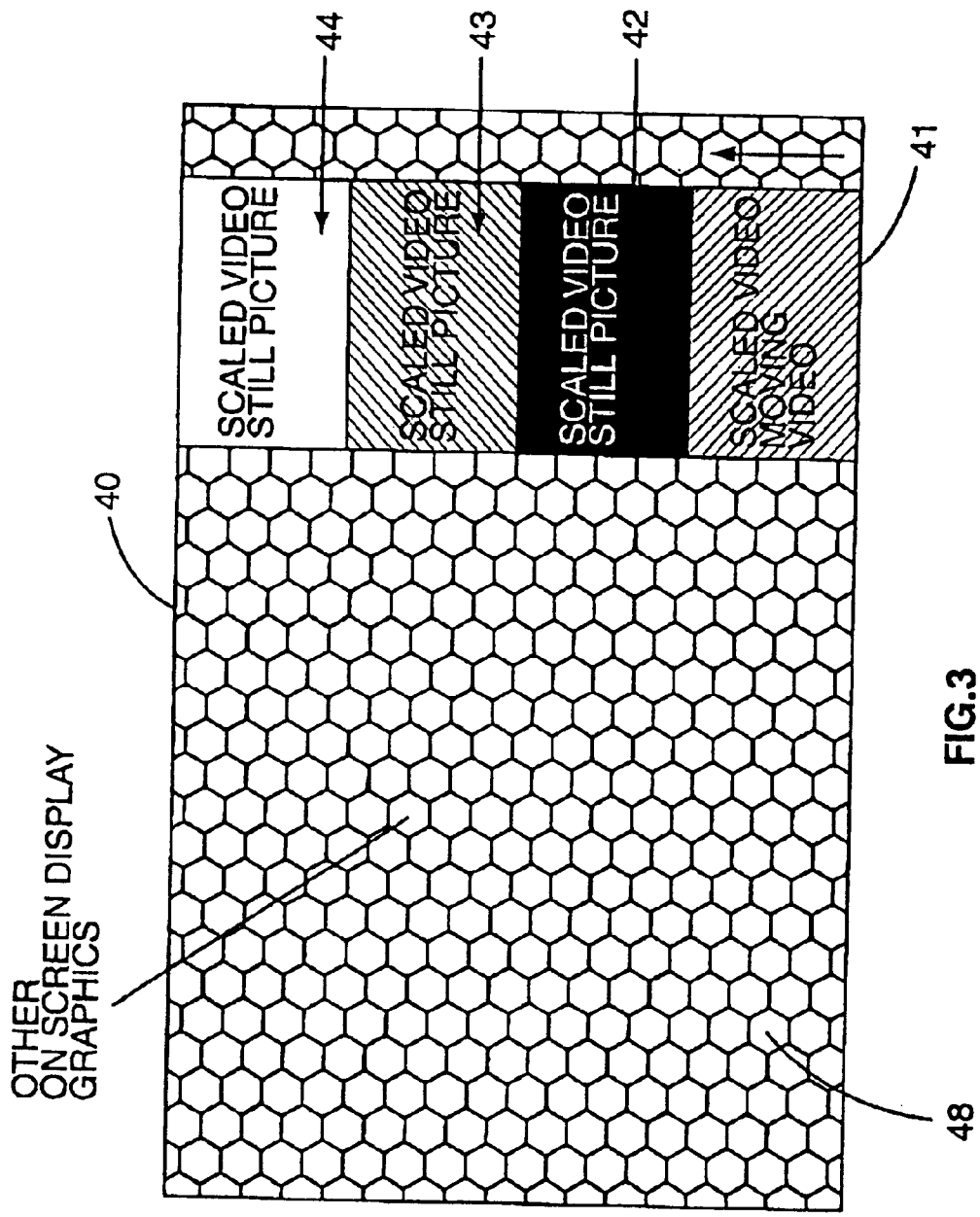
FIG. 3 shows the fifth source of FIG. 2 scrolled into position for display at the bottom with other sources scrolled up one position.

The viewer can use control 30 to select one or more scaled video sources for viewing in a still picture format. In this case a single frame is sampled from each selected source, downscaled by the video decoder, and placed in the frame buffer. The viewer may also use control 30 to view for example four of the five selected 41–45 sources on screen 40 as shown in FIGS. 2 and 3. Downscaled frame 41 is temporarily held in frame buffer 28 but not shown on screen 29. Other on-screen display graphics 48 may appear in the remainder of screen 40. Alternatively the viewer may choose to view one of the real time video sources in full size on the remainder of the screen. The choice may be made for example, by using cursor movement arrow buttons on control 30 and clicking a button when a cursor is over one of the downscaled frames. The viewer can also use control 30 to scroll downscaled frame 41 into view, moving frames 42–44 up one space as shown in FIG. 3. It will be obvious to one of ordinary skill that other control options may be implemented including but not limited to horizontal scrolling, clicking to view a source in real time at full size, selecting one of the sources to view in real time (showing full motion) in downscaled format, or selecting various downscaling size options.

While there have been shown and described what are at present considered the preferred embodiments of the invention, it will be obvious to those skilled in the art that various changes and modifications may be made therein without departing from the scope of the invention as defined by the appended claims.

What is claimed is:

1. A system for creating multiple scaled videos from at least two encoded video sources each having a plurality of frames, said system comprising:

means for switching between at least two encoded video sources, each having a plurality of frames;

a digital video decoder, coupled to said means for switching, having an on screen display processor comprising a down-scaling function for generating downscaled frames from said plurality of frames and means for processing said downscaled frames as either a color mapped region or a direct color region; and a frame buffer, coupled to said digital video decoder, having storage for one or more downscaled frames from each of said at least two encoded video sources.

2. The system of claim 1 further comprising a display coupled to said video decoder for viewing one or more of said one or more downscaled frames.

3. The system of claim 2 further comprising a control means for selecting which of said one or more downscaled frames are shown on said display.

4. The system of claim 3 wherein said control means is a remote control.

5. The system of claim 3 wherein said control means is adapted for scrolling said one or more downscaled frames into view on said display.

6. The system of claim 3 wherein said control means is adapted to select one of said at least two video sources for continuous decoding.

7. The system of claim 6 wherein said control means is adapted to allow said one of said at least two video sources to be viewed on said display at full size.

8. A system for creating multiple scaled videos from at least two encoded video sources each having a plurality of frames, said system comprising:

a selecting switch having as inputs at least two encoded video sources each having a plurality of frames, and an output providing one of said at least two encoded video sources;

a digital video decoder, coupled to said output of said selecting switch, having an on screen display processor comprising downscaling circuitry adapted for generating downscaled frames from said plurality of frames and means for processing said downscaled frames as either a color mapped region or a direct color region; and a frame buffer, coupled to said digital video decoder, having storage for one or more downscaled frames from each of said at least two encoded video sources.

9. A method of creating multiple scaled videos from at least two encoded video sources each having a plurality of frames, said method comprising the steps of:

switching between at least two encoded video sources, each having a plurality of frames;

decoding said video sources with a digital video decoder having a down-scaling function, including generating downscaled frames from said plurality of frames and processing said downscaled frames as either a color mapped region or a direct color region; and storing one or more downscaled frames from each of said at least two encoded video sources in a frame buffer.

10. The method of claim 9 further comprising viewing one or more of said one or more downscaled frames on a display coupled to said video decoder.

11. The method of claim 10 further comprising selecting which of said one or more downscaled frames are shown on said display.

12. The method of claim 11 further comprising selecting with a remote control which of said one or more downscaled frames are shown on said display.

13. The method of claim 11 further comprising scrolling said one or more downscaled frames into view on said display.

14. The method of claim 11 further comprising selecting one of said at least two video sources for continuous decoding.

15. The method of claim 14 further comprising viewing said one of said at least two video sources on said display at full size.

* * * * *